United States Patent
Lamprecht et al.

(10) Patent No.: US 6,984,256 B2
(45) Date of Patent: Jan. 10, 2006

(54) SYSTEM FOR COLLECTING AND FILTERING IMAGING BY-PRODUCTS

(75) Inventors: Anton W. Lamprecht, Richmond (CA); Dean Laurent Leonard, Bowen Island (CA); William John Dall, Vancouver (CA); David Bruce Burgess, Vancouver (CA); Alexander Kheifets, Coquitlam (CA)

(73) Assignee: Creo Inc., Burnaby (CA)

( * ) Notice: Subject to any disclaimer, the term of this patent is extended or adjusted under 35 U.S.C. 154(b) by 216 days.

(21) Appl. No.: 10/608,104

(22) Filed: Jun. 30, 2003

(65) Prior Publication Data

US 2004/0055464 A1    Mar. 25, 2004

Related U.S. Application Data

(60) Provisional application No. 60/392,050, filed on Jun. 28, 2002.

(51) Int. Cl.
*B01D 35/143*    (2006.01)

(52) U.S. Cl. .................... 95/23; 95/25; 95/26; 55/467; 96/422; 96/424

(58) Field of Classification Search .................... 95/19, 95/23, 25, 26; 55/467, 472, 385.2; 96/417, 96/418, 419, 422, 421, 424
See application file for complete search history.

(56) References Cited

U.S. PATENT DOCUMENTS

| | | | |
|---|---|---|---|
| 4,751,501 A | 6/1988 | Gut | |
| 4,786,295 A * | 11/1988 | Newman et al. | .............. 96/400 |
| 6,186,140 B1 | 2/2001 | Hoague | |
| 6,203,590 B1 * | 3/2001 | Byrd et al. | .................... 55/319 |
| 6,387,156 B1 | 5/2002 | Richardson, Jr. et al. | |

* cited by examiner

*Primary Examiner*—Robert A. Hopkins
(74) *Attorney, Agent, or Firm*—Oyen Wiggs Green & Mutala LLP

(57) ABSTRACT

An operational state of a system for filtering imaging by-products from an airflow is monitored by comparing a measurement of the flow rate of the airflow to a threshold. Additionally, an operational state of a filtration element is monitored by accumulating a count indicative of the remaining capacity of the filtration element in a memory device coupled to the filtration element.

49 Claims, 1 Drawing Sheet

SYSTEM FOR COLLECTING AND FILTERING IMAGING BY-PRODUCTS

REFERENCE TO RELATED APPLICATION

This application claims the benefit of the filing date of U.S. Application No. 60/392,050, filed 28 Jun. 2002.

TECHNICAL FIELD

This invention relates to imaging laser sensitive media and more particularly to the collection and filtering of by-products which are generated during laser imaging operations.

BACKGROUND

During imaging (for example, imaging of laser-sensitive media), the interaction of the laser and the media causes a physical and/or chemical change to the imaged areas of the media. In this process, matter may be expelled from the media. In some cases, this matter comprises the by-products of intentional imagewise ablation of the media. In other cases, this matter comprises unintentionally expelled imaging by-products. The by-products expelled during imaging may generally include particulate debris and/or gaseous emissions.

The expelled matter is typically collected and drawn away from the vicinity of the imaging laser by a nozzle of some type which is connected to an airflow created by an air mover (e.g. a blower). The airflow containing the expelled matter is subsequently passed through a filtration system to remove particulate and gaseous emissions from the airflow. An example of such a system is the Debris Removal System sold by Creo Inc. of Burnaby, British Columbia, Canada, as an accompaniment to various imaging devices also produced by Creo Inc., such as the Trendsetter™ and Trendsetter VLF™ imaging systems. Depending on the nature of the expelled by-products, the filtration may include one or more stages of particulate filtration and/or chemical filtration. Chemical filtration is usually accomplished by adsorption of gaseous by-products by solid sorbents such as activated carbon, for example.

U.S. Pat. No. 4,751,501 (Gut) describes a system for detecting a clogged particulate filter. The system includes a detection circuit for detecting a pressure drop across a filter and a sensor for sensing airflow through a duct. A comparison circuit is connected to the pressure drop detector and the airflow sensor to provide an output which indicates whether the filter is clogged.

Monitoring the end of the service life of chemical filters has been previously accomplished by specifying in written instructions a time of service after which the filter should be replaced or a weight increment. In some cases, users detect the end of the service life of chemical filters by smelling materials which have passed through the filter and which should have been trapped in the filter.

Most known methods for detecting the end of service life of chemical filters do not directly assess remaining sorbent capacity. Those known methods, which do attempt to assess the sorbent capacity, are typically impractical for use in the by-product removal systems of media imaging devices. In general, it is desirable to use filters to the maximum of their capacity and at the same time to ensure that their service life is not exceeded. Furthermore, it is desirable to have some indication of the integrity and proper functioning of the filtration system as a whole. The ability to assess the remaining sorbent capacity of a filter may help to achieve these objectives.

A particulate filter typically becomes filled with debris as it filters particles from an airflow. The end of the filter's service life may be determined by measuring a pressure drop across the filter. For example, the filter may be deemed to have reached the end of its service life when the pressure drop increases beyond a predetermined pressure drop limit. Such a pressure drop monitoring technique may be sufficient in a filtration system where the airflow is constant, but such techniques are not effective where the flow rate is variable, as is often the case in systems for collecting particulate by-products produced by laser imaging systems.

Determining that a particulate filter is at the end of its service life when a pressure drop across the filter reaches a predetermined pressure drop limit, regardless of the airflow, may substantially underestimate the capacity of the filter. This technique does not account for variation in the air mover performance, which may occur because of voltage or frequency variation. For example, when the air mover is driven by a DC brushless motor, voltage variation can affect its performance and when the air mover is driven by an induction motor, frequency variation can affect its performance. Similarly, the technique of determining filter service life using the pressure drop over the filter regardless of air flow does not account for variation in the resistance to air flow which may arise, for example, if a hose is crushed, kinked, or bent. With the same amount of particulate debris in the filter, a higher airflow causes a greater pressure drop across the filter, possibly resulting in a premature indication that the predetermined pressure drop limit has been reached. Because of these factors, a substantial error in determining filter service life may occur.

SUMMARY OF INVENTION

Methods and systems for monitoring the status of filtration systems used to condition airflows containing imaging by-products can verify that filtration elements and other parts of the system are operative.

A first aspect of the invention provides a method for determining an operational state of a system for filtering by-products generated during a media imaging operation. The method involves collecting the by-products in an airflow and channeling the airflow containing the by-products through at least one filtration element. A flow rate of the airflow is measured in at least one location in the system and an operational state of the system is determined at least in part by comparing the flow rate to at least one threshold.

The method may involve measuring a first flow rate of the airflow at a first location and measuring a second flow rate of the airflow at a second location. Preferably, the first and second locations are spaced apart within the system.

Another aspect of the invention provides a system for filtering by-products generated during a media imaging operation. The system comprises a filtration unit having an inlet, an outlet and an air mover for generating an airflow therethrough. A collection nozzle is coupled to the inlet and is locatable proximate to the imaging operation for collecting the by-products in the airflow. A flow rate sensor generates a signal indicative of a flow rate of the airflow at one location in the system and a comparator receives the signal and compares the signal to at least one threshold to determine an operational state of the system.

Yet another aspect of the invention provides a method for determining an operational state of a filtration element used within a system for filtering by-products generated during a media imaging operation. The method involves collecting the by-products in an airflow and channeling the airflow containing the by-products through the filtration element. A count indicative of a remaining capacity of the filtration element is maintained in a memory device which is coupled to the filtration element. The remaining capacity of the filtration element may then be determined based at least in part on the count.

Another aspect of the invention provides a system for filtering an airflow containing imaging by-products. The system comprises a filtration unit having an inlet, an outlet and an air mover for generating the airflow between the inlet and the outlet. A filtration element is located in a path of the airflow between the inlet and the outlet. The system also comprises a memory device coupled to the filtration element for storing information indicative of a remaining capacity of the filtration element.

Further features and aspects of the invention are described below.

BRIEF DESCRIPTION OF THE DRAWING

The appended

DESCRIPTION

Figure 1:
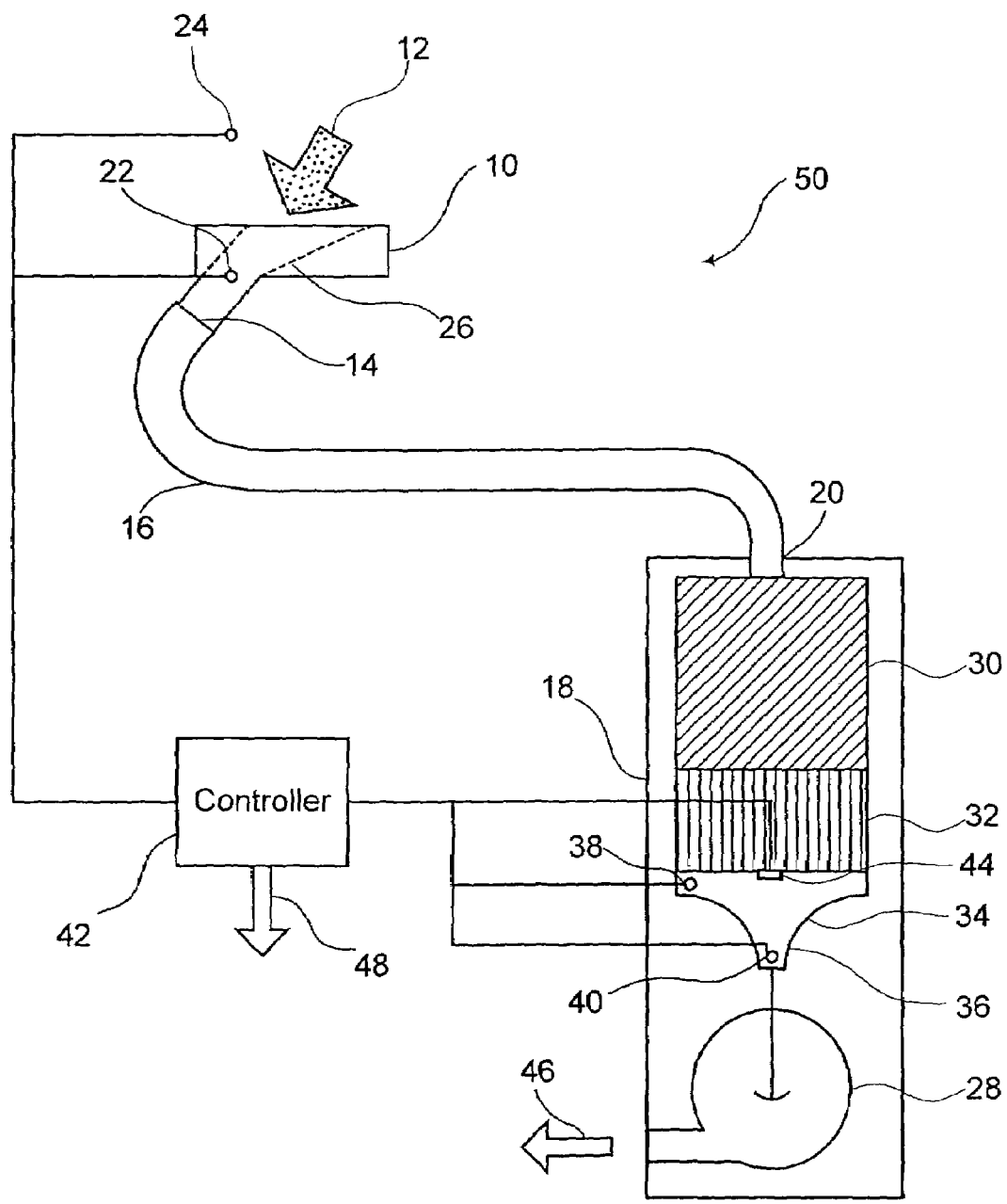
FIG. 1, is a schematic illustration which illustrates a particular embodiment of the invention. The invention is not limited to the specific features shown in FIG. 1.

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

The invention can be applied to collecting and filtering gaseous and particulate by-products which are generated during laser imaging operations. In one particular embodiment of the invention, one or more operational states of a filtration system are determined by monitoring a flow rate of an airflow at two locations in the system: one at an inlet to the system and one at an outlet from the system. Preferably, the flow rate of the airflow is maintained above a specified minimum value to ensure acceptable collection efficiency.

A filtration system 50 according to one particular embodiment of the invention is shown in FIG. 1. A collection nozzle 10 is generally situated proximate to a location where imaging by-products 12 are generated. Imaging by-products 12 may originate from any imaging operation that generates gaseous and/or particulate by-products. Collection nozzle 10 may be a nozzle of the type described in commonly assigned U.S. patent application Ser. No. 10/360,929, which is incorporated herein by reference. In general, however, nozzle 10 may comprise any suitable orifice positioned to evacuate or otherwise draw by-products 12 away from a region proximate to the imaging operation.

Imaging by-products 12 collected by nozzle 10 are evacuated via a port 14. A hose 16 connects port 14 to filtration unit 18 via port 20. An air mover 28 draws air containing by-products 12 through nozzle 10, port 14, hose 16, port 20 and into filtration unit 18. Air mover 28 also vents filtered air 46 from filtration unit 18 into the environment or channels the air away from filtration unit 18 via an exhaust conduit (not shown). Hose 16 may be of any reasonable length provided that the hose size and air mover 28 are appropriately chosen. Filtration unit 18 may be located some distance from the actual imaging area or may be located inside the imaging device (not shown).

A first flow measurement is made at a location 22 in a vicinity of collection nozzle 10 at the inlet to filtration system 50. In the illustrated embodiment, flow measurement location 22 is in collection nozzle 10. Flow measurement may be accomplished by providing a pressure sensor at location 22 or by running a conduit from a suitably positioned pressure tap at location 22 to a remotely located pressure sensor. In such cases the physical parameter measured at location 22 is pressure. However, the measured pressure may be converted into an estimate of flow rate. Based on the known cross-sectional area of nozzle conduit 26 at location 22, the pressure measurement at location 22 and a measurement of the atmospheric pressure at some reference location 24, the flow rate may be estimated using Bernoulli's equation and appropriate adjustments applied to account for losses.

To calibrate filtration system 50, a differential pressure between reference location 24 and location 22 (or an electrical signal corresponding to this differential pressure) may be measured for a range of flow rates that will be encountered. Using this information, a calibration curve relating the pressure (or electrical signal) to a flow rate is established. Particulars of this calibration curve may be stored in a memory (not shown) which is accessible to controller 42. In operation, the calibration curve may be used by controller 42 to convert pressure measurements (or electrical signals corresponding to pressure measurements) into actual flow rates. Additionally or alternatively, system 50 may be calibrated during fabrication by inserting a reference flow meter (not shown) at some point along the flow path.

Filtration unit 18 may comprise a number of different filtration elements, depending on the type of particulate and/or gaseous by-products generated in a particular imaging operation. In the illustrated embodiment, filtration unit 18 comprises a particulate filtration element 30 and a gaseous filtration element 32. Particulate filtration element 30 removes particulate matter from the airflow, after which the substantially particulate-free air is passed to chemical filtration element 32, where target gaseous by-products are removed. In alternative embodiments, filtration unit 28 comprises larger or smaller numbers of filtration elements which may be of various types. For example, filtration unit 28 may comprise coarse particulate filtration element(s), fine particulate filtration element(s) and/or different composition chemical filtration elements.

A bellmouth 34 located downstream from chemical filtration element 32 provides a throat area 36 which facilitates a differential pressure measurement between locations 38 and 40. A differential pressure measurement between locations 38 and 40 permits the application of Bernoulli's equation as described above to estimate the air flow rate at the exit from filtration elements 30, 32. Determination of the outlet flow rate at bellmouth 34 allows direct comparison with the inlet flow rate at nozzle 10. The pressure measurement at locations 38, 40 may also be calibrated as described above to generate and store a calibration curve which relates the differential pressure to the flow rate.

While the illustrated system 50 determines flow rate from differential pressure measurements, those skilled in the art will appreciate that flow rate measurement(s) may be made using any suitable flow measuring technology including suitable mass or volumetric flow sensors which are known in the art.

Having determined the pressures and the corresponding inlet flow rate at nozzle 10 and outlet flow rate at bellmouth 34, a number of operational states of system 50 may be determined and/or evaluated by examining these flow rates and pressures.

TABLE 1

| SYMBOL | PHYSICAL PARAMETER |
|---|---|
| $P_1$ | inlet location vacuum pressure |
| $P_{max}$ | maximum allowable inlet vacuum pressure |
| $Q_1$ | inlet location flow rate |
| $Q_2$ | outlet location flow rate |
| $Q_{maxdiff}$ | maximum allowable difference between Q1 and Q2 |
| $Q_{min}$ | minimum allowable flow rate |
| $Q_0$ | zero flow rate |
| $Q_{low}$ | very low flow rate (below Qmin, but above Q0) |
| $Q_{mar}$ | marginal flow rate (above Qmin) |

The parameters listed in Table 1 include parameters that may be measured at any given time and predetermined limits that may be set by previous experimentation, calculation, estimation or the like. Based on these parameters, a number of different system operational states may be determined and/or evaluated, as summarized in Table 2. Advantageously, by measuring the flow rate at two locations, many more system operational states become determinable than would be the case for a single flow rate measurement or a pressure measurement alone. Similar results may be achieved by separately measuring pressure and flow rates (using some other flow rate measurement technique).

TABLE 2

| Parameter State | System Operational State |
|---|---|
| $P_1 > P_{max}$ AND $Q_2 < Q_{min}$ | Collection nozzle is blocked |
| ABS $(Q_2 - Q_1) > Q_{maxdiff}$ AND $Q_1 < Q_0$ | Hose is disconnected |
| ABS $(Q_2 - Q_1) > Q_{maxdiff}$ AND $(Q_1 < Q_{min}$ OR $Q_2 < Q_{min})$ | Partial blockage of collection nozzle, or a leak, and the flow rate is below minimum |
| ABS $(Q_2 - Q_1) > Q_{maxdiff}$ AND NOT $(Q_1 < Q_{min}$ OR $Q_2 < Q_{min})$ | May be partial blockage of collection nozzle, or a leak, but the flow rate is above minimum |
| $Q_1 < Q_0$ AND $Q_2 < Q_0$ | Air mover is not operating |
| $Q_1 \leq Q_{low}$ OR $Q_2 \leq Q_{low}$ | Very low flow rate; possible air mover malfunction |
| $Q_1 \leq Q_{min}$ OR $Q_2 \leq Q_{min}$ | Particulate filtration element is full |
| $Q_1 \leq Q_{mar}$ OR $Q_2 \leq Q_{mar}$ | Particulate filtration element almost full |

Controller 42 may be provided with one or more of the parameters outlined in Table 1 and may use these parameters to determine one or more of the operational states described in Table 2 and to indicate such operational states to an operator for corrective action. Additionally or alternatively, should a particular operational state, such as the depletion or expiry of a filtration element, be determined as unsafe, controller 42 may inhibit the operation of the imaging device until the unsafe operational state is remedied by changing the filtration element or otherwise correcting the fault. Controller 42 may comprise one or more embedded processors, stand-alone controllers, computers, workstations or the like executing suitable software and may be interfaced to other similar controllers via bus 48. Controller 42 may also be implemented by suitable electronic circuitry. For example, such electronic circuitry may comprise a receptor and/or a comparator circuit that drives warning lights and electromechanical interlocks. The warnings generated by controller 42 may be displayed on a workstation screen, illuminate a warning light and/or sound an audible alarm, for example.

Filtration unit 28 comprises chemical filtration element 32, which removes gases and/or odours from an airflow containing imaging by-products. Chemical filtration elements commonly comprise a sorbent, such as activated carbon, for example. Some sorbents are specially treated to filter certain specific gaseous compounds. The capacity of a chemical filtration element is typically limited by its sorbent capacity. Under a given set of operating conditions, such as temperature, air velocity, and by-product concentration, for example, a chemical filtration element can generally collect a limited amount of target gases before it becomes saturated and ineffective at adsorbing the target gases.

Unlike particulate filtration elements, chemical filtration elements typically do not display an appreciable pressure drop or flow reduction on reaching their capacity. Chemical filtration elements may exhibit a slight increase in mass, but this mass increase is small and difficult to detect. An effective means of predicting chemical filtration element service life involves maintaining an estimate of the amount of gaseous compound(s) which has been channeled to the filtration element. This estimate may then be compared against a predetermined capacity of the filtration element. The end of the useful life of a chemical filtration element can thus be predicted. The amount of gaseous compound(s) being channeled to the filtration element is difficult to measure directly. However, an estimate of this parameter may be indirectly determined by tracking the area of imaged media. For example, a generation rate per unit area may be predetermined for a specific type of media and multiplied by the imaged area to provide an estimate of the amount of gaseous compound(s) channeled to the filtration element. Information relating to the area of imaged media may be made available by the imaging device controller (not shown).

One problem with estimating the amount of gaseous compound(s) being channeled to the filtration element is that, if the estimate is lost, or if a filtration element is mistakenly or otherwise replaced with an old filtration element instead of a new filtration element, system 50 would be unable to detect this condition. A solution to this problem is to accumulate a count in the filtration element itself. Such a count is related to the usage of the particular filtration element. For example, the count may be related to an area of media imaged when the particular filtration element is used in system 50. This count may then be used by controller 42 to determine an estimate of the usage and/or remaining capacity of the particular filtration element. For example, where the count comprises an area of imaged media, controller 42 may use the count to estimate the amount of gaseous compound(s) which has been channeled to the filtration element, as discussed above.

In the illustrated embodiment, an electronic memory device 44 is embedded in, or otherwise coupled to, chemical filtration element 32. Memory device 44 stores a count, as described above. Memory device 44 may store a variety of additional information, such as the type of its associated filtration element 32, the remaining capacity of its associated filtration element 32, the maximum capacity of its associated filtration element 32, the chronological time that its associated filtration element 32 has been in use, and a unique identification number for its associated filtration element 32, for example. Although not shown in the illustrated embodiment, a memory device similar to memory device 44 may also be used with particulate filtration element 30.

Examples of a memory device 44, which may be incorporated in a filtration element, include the iButton® or other products based on the 1-Wire® transfer protocol developed by Dallas Semiconductor Corp. of Dallas, Tex. Such devices may be pre-programmed to accumulate a count related to the usage of its associated filtration element 32 and may also store other types of information described above. The iButton® can be purchased in various configurations and may be connected to controller 42 or some other computer via an interface, such as a Blue Dot™ receptor.

Advantageously, if filtration element 32 containing memory device 44 is removed and re-installed in system 50, the count remains unchanged as the count is accumulated in memory device 44 which is coupled to filtration element 32 itself. Based on information stored in memory device 44, controller 42 may be configured to signify that an inappropriate filtration element is installed for a selected media type, providing an additional safety check. Accordingly, the coupling of memory device 44 to its associated filtration element 32 may prevent overriding of safety features of system 50 or accidental re-use of the same filtration element 32.

Examples of the types of information that may be stored in memory device 44 are provided in Table 3 along with associated symbols.

TABLE 3

| SYMBOL | PARAMETER |
| --- | --- |
| FT | filtration element type |
| FU | filtration element usage |
| MU | maximum allowable filtration element usage |
| UT | usage threshold value at which the filtration element is deemed to be almost expired; expressed as a percent of MU |
| CT | value of chronological timer at any given point in time |
| $CT_{max}$ | maximum allowable time |
| ID | unique identification number |

Controller 32 may use the information stored in memory device 44 to determine various operational states of system 50. Specific examples of operational states that may be determined from the information stored in memory device 44 are provided in Table 4. For a sorbent that has a limited shelf life, the chronological timer parameter CT is useful for determining whether a filtration element has reached the limit of its temporal shelf life $CT_{max}$. If a filtration element without a memory device 44 is installed or a filtration element is installed incorrectly, no communication will be established with controller 42 and controller 42 may indicate an appropriate fault condition.

TABLE 4

| VARIABLE STATE | SYSTEM OPERATIONAL STATE |
| --- | --- |
| FT ≠ Valid Filtration Element Type | wrong type of filtration element is installed |
| FU > UT * MU | the chemical filtration element has almost expired |
| FU ≥ MU | the chemical filtration element has expired |
| CT ≥ $CT_{max}$ | the time limit has expired |
| ID ≠ Valid list of ID numbers | invalid filtration element type, no filtration element is installed, or filtration element is installed incorrectly |

To establish the maximum capacity of a particular chemical filtration element used with a particular media, calibration tests or calculations may be performed to determine the appropriate type of filtration element and the maximum imaged area that the filtration element can accommodate. The area may be determined for each type of media and each type of filtration element by direct testing or by calculation. Direct testing is relatively expensive and time-consuming, because a suitable amount of media (which may be relatively expensive) must be imaged to perform the calibration. However, direct testing in this manner is currently considered to provide the most accurate determination of filtration element capacity. It is prudent to perform calibration based on direct testing at least once for each group of similar media.

As an alternative to direct testing, a calibration calculation may be performed based on the total molar capacity of the filtration element for a certain family of chemical compounds. This approach may be especially advantageous for chemisorption, as opposed to physical sorption, because chemisorption is usually more specific to certain families of chemical compounds. Calibration of a filtration element based on direct testing may be performed for one media type to determine the capacity of the filtration element for that particular media type. Thereafter, the filtration element capacity for other media types that release the same principal by-products may be scaled by calculation, provided there is knowledge of the generation rate of the various by-products for each type of media.

As an example of this calibration calculation, the major components of gaseous emissions from certain types of media are aldehydes (formaldehyde, acetaldehyde, and others). There are chemisorbents developed specifically for aldehydes. Thus, calibration and modeling may be based on the total aldehyde capacity of the filtration element. As long as the reaction in the chemisorbent is specific to the aldehydes' —CHO group, the molar sum amount of aldehydes should be the same for a given capacity. An example of scaling from one media type (Plate A) to another (Plate B) for formaldehyde, acetaldehyde and propionaldehyde is shown in Table 5 below.

TABLE 5

| | Plate A Generation rate | | Plate B Generation rate | |
| --- | --- | --- | --- | --- |
| ALDEHYDE | mg/m² | mmol/m² | mg/m² | mmol/m² |
| Formaldehyde HCHO (mmole = 30 mg) | 4.0 | 0.13 | 2.0 | 0.067 |
| Acetaldehyde CH₃CHO (mmole = 44 mg) | 3.0 | 0.068 | 21 | 0.48 |
| Propionaldehyde CH₃CH₂CHO (mmole = 58 mg) | 8.0 | 0.14 | 0.0 | 0.0 |
| Total | | 0.34 | | 0.55 |

From Table 5, if 1000 m² of Plate A would normally saturate the filtration element, then the area of Plate B that could be imaged may be calculated as:

$$Area_B = Area_A \times (Total_A/Total_B) = 1000 \times (0.34/0.55) = 619 \text{ m}^2$$

Memory device 44 and/or controller 42 may be programmed to take into account differences between various media types. For example, a filtration element may be assigned a "maximum usage number", which may be just an arbitrary number (e.g. 100), and each media type may be characterized by an "emissions intensity number" (EI), which is the maximum usage number divided by the maximum area to be imaged for the given media type. Using the same example of Plate A and Plate B from Table 5:

$EI_A = 100/1000 = 0.10$ $EI_B = 100/619 = 0.16$

If, for example, 350 m² of Plate A has been imaged, the filtration element usage would be 0.10*350=35, and the remaining usage 100−35=65. This would leave sufficient filtration capacity for the imaging of 650 m² of Plate A (65/0.10), or 406 m² of Plate B (65/0.16). The count stored in memory element 44 may comprise such indications of usage and/or remaining usage.

Filtration unit 18 may comprise mechanical filtration element detectors (not shown) which detect the presence of filtration elements 30, 32. For example, when filtration elements 30, 32 are properly installed within filtration unit 18, they may activate a suitable mechanical switch. Such a switch may be a mechanical, plunger-style switch, for example.

As will be apparent to those skilled in the art in light of the foregoing disclosure, many alterations and modifications are possible in the practice of this invention without departing from the spirit or scope thereof. For example:

- As discussed briefly above, system 50 may comprise more than one particulate filtration element and/or more than one chemical filtration element. In the case of multiple chemical filtration elements, it is preferable, but not necessary, that each filtration element comprises a separately accessible memory element 44.
- The parameters and operational states listed in Tables 1 through 4 are provided by way of example. Those skilled in the art will appreciate that the systems and methods disclosed above may be used to determine other parameters and operational states which are not listed in Tables 1 through 4.
- Throughout the above description, filtration system 50 is described as operating with air in an environment of air. In some applications, system 50 may be used with a gas other than air and/or in an environment other than air. In such applications, "air blower" 28 may establish a flow of some working gas other than air through filtration system 50 and system 50 may be used to filter particulate and gaseous by-products from the flow of working gas. The word "airflow" should be understood to comprise working gases other than air.
- The count stored in memory element 44 may have a variety of different forms. For example, as discussed above, memory element 44 may comprise a count of the area of media imaged using its associated filtration element or memory element 44 may store a usage and/or remaining usage number for its associated filtration element. In general, the count may comprise any information which may be used by controller 42 to determine a remaining capacity of the associated filtration element.

Accordingly, the scope of the invention is to be construed in accordance with the substance defined by the following claims.

What is claimed is:

1. A method for filtering by-products generated during a media imaging operation, the method comprising:
   collecting the by-products in an airflow;
   channeling the airflow through at least one filtration element;
   measuring a first flow rate of the airflow in a first location; and,
   determining an operational state of the system indicative of a desirability for operator intervention based at least in part on a comparison of the first flow rate to at least one first threshold.

2. A method according to claim 1, comprising measuring a second flow rate of the airflow at a second location spaced apart from the first location.

3. A method according to claim 2, wherein determining the operational state of the system is based at least in part on a comparison of the second flow rate to at lease one second threshold.

4. A method according to claim 2, wherein the first location is upstream from the at least one filtration element and the second location is downstream from the at least one filtration element.

5. A method according to claim 4, comprising determining an operational state of the at least one filtration element based at least in part on the first and second flow rates.

6. A method according to claim 2, wherein the first location is upstream from the second location.

7. A method according to claim 6, comprising determining an operational state of a portion of the system between the first and second locations based at least in part on at least one of the first and second flow rates.

8. A method according to claim 1, wherein determining the operational state of the system based at least in part on the comparison of the first flow rate to at least one first threshold comprises identifying a potential existence of at least one of: an airflow blockage in the system and an airflow leak in the system.

9. A method according to claim 1, wherein determining the operational state of the system based at least in part on the comparison of the first flow rate to at least one first threshold comprises determining whether the filtration element has reached a capacity.

10. A method according to claim 1, wherein measuring the first flow rate of the airflow in the first location comprises measuring pressure at one or more locations.

11. A method according to claim 10 wherein measuring the first flow rate comprises measuring a first pressure at a point where the airflow has a first cross-sectional area and a second pressure at a point where the airflow has a second cross-sectional area different from the first cross-sectional area.

12. A method according to claim 1 wherein the first location is upstream from the at least one filtration element and the method comprises; measuring a second flow rate of the airflow in a second location downstream from the at least one filtration element and determining an operational state of the filtration element based at least in part on both the first and second flow rates.

13. A method according to claim 7, wherein determining the operational state of the portion of the system between the first and second locations is based at least in part on both the first and second flow rates.

14. A system according to claim 1 wherein the at least one filtration element comprises at least one particulate filter.

15. A method according to claim 12 comprising determining a potential existence of an airflow blockage between the first and second locations based at least in part on both the first and second flow rates.

16. A method according to claim 12 comprising determining a potential existence of an airflow leak between the first and second locations based at least in part on both the first and second flow rates.

17. A method according to claim 13, comprising, in response to determining the operational state of the portion of the system between the first and second locations, signaling a potential existence of a blockage between the first and second locations.

18. A method according to claim 13, comprising, in response to determining the operational state of the portion of the system between the first and second locations, signaling a potential existence of an airflow leak within the system.

19. A method according to claim 7, comprising, in response to determining the operational state of the portion of the system between the first and second locations, signaling that the at least one filtration element requires servicing or replacement.

20. A method according to claim 13, wherein the first location is proximate the imaging operation, wherein determining the operational state of the portion of the system between the first and second location comprises comparing the first and second flow rates, and wherein the method comprises, in response to the comparison, signaling a potential existence of at least a partial blockage proximate to the imaging operation.

21. A system for filtering by-products generated during a media imaging operation, the system comprising:
a filtration unit having an inlet and an outlet;
a collection nozzle coupled to the inlet and locatable proximate to the imaging operation for collecting the by-products;
an air mover connected to generate an airflow through the filtration unit and the collection nozzle;
a first sensor for generating a first signal indicative of a flow rate of the airflow in a first location; and,
a comparator configured to receive the first signal and to compare the flow rate of the airflow in the first location to at least one threshold to determine an operational state of the system indicative of a desirability for operator intervention.

22. A system according to claim 21, comprising means for communicating an indication of the operational state to a user.

23. A system according to claim 21, comprising a second sensor for generating a second signal indicative of a second flow rate of the airflow in a second location spaced apart from the first location.

24. A system according to claim 23 wherein the comparator is configured to receive the first and second signals and to determine the operational state of the system based at least in part on at least one of: the flow rate of the airflow in the first location and the second flow rate of the airflow in the second location.

25. A system according to claim 21, wherein the system comprises a pressure transducer.

26. A system according to claim 21 wherein the first location is at the collection nozzle.

27. A system according to claim 23 wherein the system comprises at least one filtering element located in the airflow between the collection nozzle andthe outlet and wherein the first location is at the collection nozzle and the second location is downstream in the airflow from the at least one filtering element.

28. A system according to claim 27 wherein the air mover is downstream from the filtering element, and the second location is in a conduit having a progressively decreasing cross-sectional area between the filtering element and the air mover.

29. A system according to claim 21
wherein the first location is upstream from the filtration unit, and
the system comprises at least one filtration element located in the airflow between the collection nozzle and the outlet and a second sensor for generating a second signal indicative of a second flow rate of the airflow in a second location downstream from the at least one filtration element, and
the comparator is connected to receive the first and second signals and is configured to determine an operational state of the at least one filtration element based at least in part on both the flow rate of the airflow in the first location and the second flow rate of the airflow in the second location.

30. A system according to claim 29 wherein the comparator is configured to determine a potential existence of an airflow blockage between the first and second locations based at least in part on both the flow rate of the airflow in the first location and the second flow rate of the airflow in the second location.

31. A method according to claim 29 wherein the comparator is configured to determine a potential existence of an airflow leak between the first and second locations based at least in part on both the flow rate of the airflow in the first location and the second flow rate of the airflow in the second location.

32. A system according to claim 24 wherein the comparator is configured to determine the operational state of the system based at least in part on both the flow rate of the airflow in the first location and the second flow rate of the airflow in the second location.

33. A system according to claim 21 wherein the filtration unit comprises at least one particulate filter located between the inlet and the outlet.

34. A system according to claim 21 wherein the comparator comprises a controller.

35. A system according to claim 32 wherein the first location is proximate to the collection nozzle and the second location is downstream from the first location and the comparator is configured to determine the operational state of the system, the operational state of the system comprising at least one of:
a blockage of the collection nozzle;
a disconnected conduit between the collection nozzle and the inlet;
a leak in the system;
a malfunction of the air mover;
a filtration element in the filtration unit having reached a predetermined fraction of its capacity; and
a filtration element in the filtration unit having reached its capacity.

36. A system according to claim 32 wherein the second location is downstream relative to the first location and wherein the comparator is configured to determine an operational state of a portion of the system between the first and second locations, the operational state of the portion comprising at least one of:
a blockage of the collection nozzle;
a disconnected conduit between the collection nozzle and the inlet;
a leak in the system;
a malfunction of the air mover;
a filtration element in the filtration unit having reached a predetermined fraction of its capacity; and
a filtration element in the filtration unit having reached its capacity.

37. A method for determining an operational state of a filtration element used within a system for filtering by-products generated during a media imaging operation, the method comprising:

collecting the by-products in an airflow;

channelling the airflow containing the by-products through the filtration element;

maintaining a count indicative of a remaining capacity of the filtration element in a memory device coupled to the filtration element; and determining the remaining capacity of the filtration element based at least in part on the count;

wherein the count comprises an indication of an area imaged during imaging operations involving the filtration element and a type of media.

38. A method according to claim 37 wherein determining the remaining capacity of the filtration element based at least in part on the count comprises multiplying the area imaged during imaging operations involving the filtration element and the type of media and a byproduct generation rate per unit area for the type of media and comparing the result to a maximum capacity of the filtration element.

39. A method for determining an operational state of a filtration element used within a system for filtering by-products generated during a media imaging operation, the method comprising:

collecting the by-products in an airflow;

channeling the airflow containing the by-products through the filtration element;

maintaining a count indicative of a remaining capacity of the filtration element in a memory device coupled to the filtration element;

determining the remaining capacity of the filtration element baaed at least in part on the count;

predetermining a by-product generation rate per unit area for a specific media; and adjusting the count based at least in part on the by-product generation rate and an area imaged during imaging operations involving the specific media.

40. A method for determining an operational state of a filtration element used within a system for filtering by-products generated during a media imaging operation, the method comprising:

collecting the by-products in an airflow;

channeling the airflow containing the by-products through the filtration element;

maintaining a count indicative of a remaining capacity of the filtration element in a memory device coupled to the filtration element;

determining the remaining capacity of the filtration element based at least in part on the count;

for each of a plurality of different media types, providing a stored corresponding by-product generation rate per unit area; and for each media type, adjusting the count based at least in part on the by-product generation rate associated with that media type and an area imaged during imaging operations involving that media type.

41. A method according to claim 40, comprising determining a capacity of the filtration element for a first media type based on an empirically determined capacity of the filtration element for a second media type and known differences between the media by-product generation rates associated with the first and second media types.

42. A method according to claim 41 comprising filtering by-products from a plurality of different media types imaged in subsequent imaging operations using the same filtration element.

43. A system for filtering an airflow containing imaging by-products, the system comprising:

a filtration unit having an inlet, an outlet and an air mover for generating the airflow between the inlet and the outlet, a replaceable filtration element located in a path of the airflow between the inlet and the outlet, the filtration element comprising a memory device for storing information indicative of a remaining capacity of the filtration element.

44. The system of claim 43 comprising a receptor configured to interface with the memory device.

45. The system of claim 43, wherein the filtration element comprises a sorbent.

46. The system of claim 44, wherein the memory device is configured to store information which is indicative of at least one of:

a filtration element type identifier;

a unique filtration element identification number;

a remaining capacity of the filtration element;

a maximum capacity of the filtration element;

an accumulated chronological time indicative of the time during which the filtration element has been installed in the system;

a maximum allowable chronological time; and an indication of a rate at which a capacity of the filtration element is consumed.

47. The system of claim 46, wherein the receptor comprises a controller and the controller is configured to use the information stored in the memory device to determine at least one system operational state selected from:

a filtration element does not match a media that is to be imaged;

a filtration element has reached a predetermined fraction of its capacity;

a filtration element has reached its maximum capacity;

a filtration element has exceeded its shelf life;

a filtration element is not installed; and a filtration element is installed incorrectly.

48. A system for filtering imaging by-products produced during an imaging operation, the system comprising:

means for generating an airflow carrying the by-products;

means for filtering the airflow to remove the by-products from the airflow;

means for detecting a flow rate of the air flow; and means for determining an operational state of the system indicative of a desirability for operator intervention based at least in part on the detected flow rate.

49. A system for filtering by-products generated during a media imaging operation, the system comprising:

a filtration unit having an inlet and an outlet;

a collection nozzle coupled to the inlet and locatable proximate to the imaging operation for collecting the by-products;

an air mover connected to generate an airflow through the filtration unit and the collection nozzle;

a first sensor for generating a first signal indicative of a flow rate of the airflow in a first locations; and, a controller configured to receive the first signal and to compare the flow rate of the airflow in the first location to at least one threshold to determine an operational state of the system indicative of a desirability for operator intervention.

\* \* \* \* \*